United States Patent Office 2,983,759
Patented May 9, 1961

2,983,759
POLYVINYL ALCOHOL PRODUCT AND PROCESS

Masakazu Matsumoto and Makoto Shiraishi, Kurashiki, Japan, assignors to Kurashiki Rayon Co., Ltd., Okayama Prefecture, Japan, a corporation of Japan No Drawing. Filed Jan. 19, 1959, Ser. No. 787,381

Claims priority, application Japan Jan. 18, 1958

4 Claims. (Cl. 260—594)

This invention relates to a novel product of polyvinyl alcohol. More specifically, the invention relates to polyvinyl alcohol products having terminal carbonyl groups and to the preparation of such products.

It has been known to prepare polyvinyl alcohol having terminal carbonyl groups by oxidizing the polyvinyl alcohol with an agent such as periodic acid or lead tetraacetate whereby 1,2 glycol groups in the polyvinyl alcohol are cleaved and oxidized to carbonyl groups. A disadvantage of this prior technique is that the molecular size of the resulting polyvinyl alcohol products having terminal carbonyl groups is dependent upon the 1,2 glycol groups in the polyvinyl alcohol precursor. The 1,2 glycol content of the polyvinyl alcohol is dependent only in the polymerization temperature and is generally very low. For example, for a polymerization temperature of −20° C., polyvinyl alcohol is produced wherein 0.56% of the vinyl alcohol units are joined in 1,2 glycol configuration, at a polymerization temperature of 60° C. 1.14 mol percent and at 100° C. polymerization 1.44 mol percent of the vinyl alcohol units have 1,2 glycol structure. Thus, the molecular weight of the polyvinyl alcohol having terminal carbonyl groups cannot be satisfactorily controlled to produce low molecular products, for example, products having a degree of polymerization of 20 to 40. Prior procedures result in the production of terminal carbonyl-containing polyvinyl alcohol of a degree of polymerization in the range 70 to 180.

Low molecular weight polyvinyl alcohol having terminal carbonyl groups is quite useful. An important use for such material is as a cross-linking agent for polyvinyl alcohol through acetal formation. Other uses will be apparent to those skilled in the art.

It is an object of the present invention to provide a process for the production of polyvinyl alcohol having terminal carbonyl groups.

It is a particular object of the invention to provide for the production of low molecular weight terminal-carbonyl containing polyvinyl alcohol.

Other objects will be apparent from the instant specification and claims.

In carrying out the present invention, polyvinyl alcohol is partially oxidized whereby a percentage of the hydroxyl groups thereof are converted to carbonyl groups, that is,

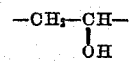

groups are oxidized to

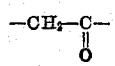

groups. Subsequently, the partially oxidized polyvinyl alcohol is treated with alkali whereby cleavage of the partially oxidized polyvinyl alcohol takes place at the carbonyl group in a reverse aldol reaction with the production of lower molecular weight polyvinyl alcohol having terminal carbonyl groups. The reverse aldol cleavage is believed to proceed as follows:

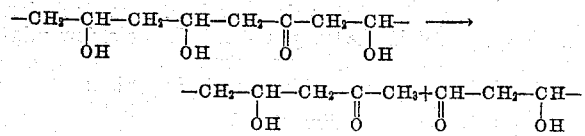

Thus, in practice of the present invention, polyvinyl alcohol having terminal carbonyl groups of almost any desired molecular weight can be produced. Low molecular weight products having a degree of polymerization in the range 20–40 as well as higher molecular weight products can be produced by proper control of the process.

Polyvinyl alcohol used in the present invention is produced in accordance with known procedures. Such procedures involve polymerizing vinyl esters such as vinyl acetate using catalysts such as azo-bis-isobutyro-nitrile, benzoyl peroxide, and the like, by bulk, solution, or emulsion polymerization. Subsequently, the polymerized ester is converted to polyvinyl alcohol, preferably by alkaline alcoholysis although acid hydrolysis can also be used.

In accordance with the invention, polyvinyl alcohol is subjected to partial oxidation to convert a desired mol per cent of the hydroxyl groups to carbonyl groups. Suitable oxidizing agents are those which will oxidize 1,3 glycol structures and include hypochlorous acid, chlorous acid, alkali metal chlorites and hypochlorites, calcium chlorites and hypochlorites (including bleaching powders), nitric acid, hyponitric acid, permanganic acid, hydrogen peroxide, acetic acid, ozone, bromine, ammonium persulfate, tertiary butyl hydroperoxide, N-bromo-succinimide, N-chloro-succinimide, and the like. Other oxidizing agents may be used.

It is usually desirable to carry out the partial oxidation in aqueous solution although solid polyvinyl alcohol can be oxidized with gaseous oxidizing agent, or the oxidation may be carried out in organic solvents. Oxidation temperatures of 0 to 100° C. are usually suitable although temperatures outside this range can be used. Oxidation times of several minutes to a number of hours, e.g. 5 minutes to 10 hours, and usually about 10 minutes to 3 hours, are employed for partially oxidizing the polyvinyl alcohol to the desired degree. The exact reaction conditions for a particular practice of the invention are readily determined by routine procedures.

The degree of polymerization of products obtained by the invention depends upon the degree of polymerization of the original polyvinyl alcohol, and extent of partial oxidation of the polyvinyl alcohol prior to reverse aldol cleavage with alkali material. For polyvinyl alcohol having a degree of polymerization of $P_0$ and containing $\alpha$ mol percent oxidized hydroxyl groups, the degree of polymerization of the cleaved product, $P$, is represented by the equation $1/P = \alpha/100 + 1/P_0$. The mol percent carbonyl groups in the cleaved product is $200 \ (1/P - 1/P_0)$ which coincides well with experimental values. Generally a mixture of products of different molecular weight having terminal carbonyl groups together with polyvinyl alcohol not having two terminal carbonyl groups is obtained through carrying out the invention.

As can be seen above, knowing the degree of polymerization of the original polyvinyl alcohol, the degree of partial oxidation in order to produce a desired product is readily found. Ordinarily, polyvinyl alcohol having a degree of polymerization above 800 and usually 1200–3000 is used although polyvinyl alcohol having a degree of polymerization outside this range can be employed. It is generally desirable to oxidize 20 mol percent or less of the hydroxyl groups, usually about 0.1–10 mol percent of the polyvinyl alcohol to produce particularly useful polyvinyl alcohol products having terminal carbonyl groups.

Strong bases are used to cleave the partially oxidized polyvinyl alcohol. Sodium hydroxide is especially preferred. Other bases which can be used include potassium hydroxide, lithium hydroxide, and the like. The cleavage is preferably carried out in aqueous solution at temperatures in the range 0–120° C. for a few minutes e.g. 2 minutes to an hour or more.

The following examples illustrate the invention:

Example I

Polyvinyl alcohol having an average degree of polymerization of 1080 was partially oxidized in aqueous solution with 200% by weight N-bromo-succinimide at 60° C. for 40 minutes. 0.255% of the polyvinyl alcohol hydroxyl groups were oxidized to carbonyl groups.

About 10 cc. of 5 N caustic soda solution was added to 350 g. of aqueous solution containing 1% by weight of the partially oxidized polyvinyl alcohol. The resulting solution was heated for 10 minutes at 95° C. under a nitrogen atmosphere to effect reverse aldol reaction. The solution was immediately cooled, and large amounts of methanol added thereto to precipitate polyvinyl alcohol product. The product was washed until neutral with methanol and air dried.

The resulting polyvinyl alcohol product had an average degree of polymerization of 320, and contained 0.453 mol percent carbonyl groups. The number of carbonyl groups per polymer molecule averaged 1.45. Theoretical values are 290 average degree of polymerization, 0.438 mol percent average carbonyl groups and 1.40 carbonyl groups per polymer molecule.

Example II 100 parts of an aqueous solution containing 5% by weight partially oxidized polyvinyl alcohol having an average degree of polymerization of 1650 and containing 5.5 mol percent carbonyl groups was mixed with 10 parts of 5 N caustic soda solution and heated to 100° C. for 5 minutes. The solution was cooled immediately and precipitated and purified as described above. Slightly yellow polyvinyl alcohol product having an average degree of polymerization of 25 and containing an average of 13.0 mol percent carbonyl groups was obtained.

We claim:

1. The method which comprises reacting polyvinyl alcohol with an oxidizing agent until up to 20 mol percent of the vinyl alcohol units are oxidized to carbonyl-group containing units having the formula

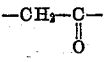

cleaving the oxidized polymer by contact with alkali, and recovering lower molecular weight polyvinyl alcohol derivatives consisting essentially of polyvinyl alcohol units and having terminal units containing carbonyl groups selected from the class consisting of aldehyde and ketone groups.

2. The method of claim 1 wherein said alkali is sodium hydroxide.

3. The method of claim 1 wherein 0.1 to 10 mol percent of the vinyl alcohol units are oxidized.

4. A polyvinyl alcohol derivative having a degree of polymerization in the range of 20 to 40, said polyvinyl alcohol derivative consisting essentially of vinyl alcohol units and having terminal units containing carbonyl groups selected from the class consisting of aldehyde and ketone carbonyl groups.

References Cited in the file of this patent

Marvel et al.: J. Am. Chem. Soc., vol. 60, pp. 1045–51 (1938).

Marvel et al.: J. Am. Chem. Soc., vol. 65, pp. 1710–14 (1943).